United States Patent
Hale et al.

(10) Patent No.: US 6,439,710 B1
(45) Date of Patent: Aug. 27, 2002

(54) PRINTED MEDIA PRODUCED BY PERMANENT HEAT ACTIVATED PRINTING PROCESS

(75) Inventors: Nathan Hale; Ming Xu, both of Mt. Pleasant, SC (US)

(73) Assignee: Sawgrass Systems, Inc., Mt. Pleasant, SC (US)

( * ) Notice: Subject to any disclaimer, the term of this patent is extended or adjusted under 35 U.S.C. 154(b) by 0 days.

(21) Appl. No.: 09/411,421

(22) Filed: Oct. 1, 1999

Related U.S. Application Data

(63) Continuation-in-part of application No. 09/206,262, filed on Oct. 27, 1998, which is a continuation-in-part of application No. 08/565,999, filed on Dec. 1, 1995, now Pat. No. 5,601,023, which is a continuation-in-part of application No. 08/207,756, filed on Mar. 8, 1994, now Pat. No. 5,485,614, and a continuation-in-part of application No. 08/506,894, filed on Jul. 25, 1995, now Pat. No. 5,734,396, which is a continuation-in-part of application No. 08/299,736, filed on Sep. 1, 1994, now Pat. No. 5,488,907, which is a continuation-in-part of application No. 08/195,851, filed on Feb. 10, 1994, now Pat. No. 5,431,501, and a continuation-in-part of application No. 09/206,262, filed on Oct. 27, 1998, which is a continuation of application No. 08/749,426, filed on Nov. 15, 1996, now abandoned, which is a continuation-in-part of application No. 08/565,999, filed on Dec. 1, 1995, now Pat. No. 5,601,023, which is a continuation-in-part of application No. 08/207,756, filed on Mar. 8, 1994, now Pat. No. 5,487,614, which is a continuation of application No. 08/195,851, filed on Feb. 10, 1994, now Pat. No. 5,431,501.

(51) Int. Cl.[7] ............................................. G01D 11/00
(52) U.S. Cl. ......................................................... 347/100
(58) Field of Search .......................... 347/100; 428/212; 101/487; 283/2; 106/31.13

(56) References Cited

U.S. PATENT DOCUMENTS

| | | |
|---|---|---|
| 3,844,806 A | 10/1974 | Wegmann |
| 3,948,828 A | 4/1976 | Becker et al. |
| 3,969,302 A | 7/1976 | Wegmann et al. |
| 3,977,828 A | 8/1976 | Becker et al. |
| 4,042,320 A | 8/1977 | Becker et al. |
| 4,042,545 A | 8/1977 | Defago et al. |
| 4,205,991 A | 6/1980 | Becker et al. |
| 4,207,067 A | 6/1980 | Becker |
| 4,265,631 A | 5/1981 | Becker |
| 4,281,999 A | 8/1981 | Becker et al. |
| 4,370,144 A | 1/1983 | Skelley et al. |
| 4,460,374 A | 7/1984 | Abel et al. |
| 4,559,150 A | 12/1985 | Becker |
| 4,689,078 A | 8/1987 | Koike et al. |
| 4,713,081 A | 12/1987 | Becker |
| 4,758,952 A * | 7/1988 | Harris, Jr. et al. ........... 101/487 |
| 5,164,232 A * | 11/1992 | Henseleit et al. ............ 427/288 |
| 6,197,409 B1 * | 3/2001 | Bodager et al. ............. 428/212 |

FOREIGN PATENT DOCUMENTS

| | | |
|---|---|---|
| GB | 1527396 | * 10/1978 |
| JP | 61-118477 | 6/1986 |
| WO | PCT/NL97/426 | 7/1996 |

* cited by examiner

*Primary Examiner*—Thinh Nguyen
(74) *Attorney, Agent, or Firm*—B. Craig Killough

(57) ABSTRACT

The present invention is a method of producing a printed a by printing heat activated ink solids in a non activated form onto a medium in a desired image by means of an ink jet printer. The invention is printed using ink or dye compositions comprising heat activated ink or dye solids. The ink compositions used to print the medium are solid at ambient temperature when used with phase change ink jet printers, and are emulsions when used with liquid ink jet printers such as free flow and bubble jet printers. The dye solids are printed in the desired design by means of a printer onto a substrate, which becomes the printed medium. The substrate may be paper, or it may be other material.

14 Claims, 2 Drawing Sheets

PRINTED MEDIA PRODUCED BY PERMANENT HEAT ACTIVATED PRINTING PROCESS

This application is a continuation-in-part of Ser. No. 09/206,262, filed on Oct. 27, 1998 which is a continuation-in-part of Ser. No. 08/565,999, U.S. Pat. No. 5,601,023, filed on Dec. 1, 1995, which is a continuation-in-part of Ser. No. 08/207,756, U.S. Pat. No. 5,485,614; filed on Dec. 8, 1994, and a continuation in part of Ser. No. 08/506,894, U.S. Pat. No. 5,734,396; filed on Jul. 5, 1991, which is a continuation-in-part of Ser. No. 08/299,736, U.S. Pat. No. 5,488,907; filed on Sep. 1, 1994, which is a continuation-in-part of Ser. No. 08/195,851, U.S. Pat. No. 5,431,501 filed on Feb. 10, 1994 . This application is a continuation-in-part of Ser. No. 9/206,262, filed on Oct. 27, 1998, which a continuation of Ser. No. 08/749,426, filed on Nov. 15, 1996 now abandoned, which is a continuation-in-part of Ser. No. 08/565,999, filed on Dec. 1, 1995 , U.S. Pat. No. 5,601,023 which is a continuation-in-part of Ser. No. 08/207,756 filed on Dec. 8, 1994 U.S. Pat. No. 5,487,614, which is a continuation of Ser. No. 08/195,851 , U.S. Pat. No. 5,431,501 filed on Feb. 10, 1994.

FIELD OF THE INVENTION

This invention relates to printing generally, and is more specifically directed to a printed medium produced by printing heat activated ink from an ink jet printer onto paper or other printable substrate as a medium.

BACKGROUND OF THE INVENTION

Words and designs are frequently printed onto clothing and other textile materials, and other objects. Common means of applying such designs to objects include the use of silk screens, and mechanically bonded thermal transfers.

The use of computer technology allows substantially instantaneous printing of images. For example, video cameras or scanning may be used to capture an image to a computer. The image may then be printed by any suitable printing means, including mechanical thermal printers, ink jet printers and laser printers. These printers will print in multiple colors.

Color ink jet printers are in common use. Color ink jet printers use combinations of cyan, yellow and magenta inks or dyes to produce multi-color images.

The primary types of ink jet printers are phase change, free flow, and bubble jet. The inks or dyes used in phase change ink jet printing are contained in a solid compound which changes state by the application of heat to liquefy the solid, whereupon the ink composition is printed. Free flow and bubble jet printers use liquid inks, although the actual printing processes of free flow ink jet printers differ from bubble jet printers.

Heat activated ink solids change to a gas at about 400° F., and have a high affinity for polyester at the activation temperature and a limited affinity for most other materials. Once the gasification bonding takes place, the ink is permanently printed and highly resistant to change or fading caused by laundry products.

Hale, U.S. Pat. Nos. 5,246,518, 5,248,363 and 5,302,223 disclose the use of thermal printers to produce an image on a medium or transfer sheet wherein the image is comprised of sublimation or other heat activated inks. The method described in Hale does not activate the ink during the printing of the medium or transfer sheet.

The process of printing heat sensitive ink solids such as sublimation inks by means of a phase change ink jet printer is similar to the process described in Hale, U.S. Pat. Nos. 5,246,518, 5,248,363 and 5,302,223. The use of heat by all ink jet printers presents the problem recognized in the Hale patents of printing heat activated inks in a non activated form by means of such printers, since the ink is exposed to high temperatures by the printer. Bubble jet printers, for example, heat the ink during the printing process to around the boiling point of the ink liquid carrier, which is typically water. Free flow ink jet printers use heat to form pressure which transports the ink during the printing process.

The use of liquid inks, as required by free flow and bubble jet printers, presents a new set of problems when trying to print ink solids. The orifices or nozzles of free flow and bubble jet printers are not designed for the dispensing of solids contained within a liquid material. The orifices of these printers are typically 5–10 microns in diameter, and clogging of the orifice will occur when ink solids of large particle size or in high volume are transferred through the orifice.

Further, when the ink solids are placed into the liquid, the ink solids tend to separate from the liquid over time and fall to the bottom of the ink container. The ink composition is typically sealed in a container at a manufacturing facility, for subsequent mounting of the container within the ink jet printer, meaning that a substantial storage time for the ink composition exists prior to use. Separation of the liquid and solids within the ink formulation presents problems with regard to the mechanical operation of the printer and the print quality achieved from use of the ink formulation. Materials which inhibit separation must also inhibit agglomeration of the solid dye particles, while allowing, and not preventing due to insulation or otherwise, activation of the ink or dye at elevated temperatures.

SUMMARY OF THE PRESENT INVENTION

The present invention is a method of producing a printed medium by printing heat activated ink solids in a non activated form onto a medium in a desired image by means of an ink jet printer. The invention is printed using ink or dye compositions comprising heat activated ink or dye solids. The ink compositions used to print the medium are solid at ambient temperature when used with phase change ink jet printers, and are emulsions when used with liquid ink jet printers such as free flow and drop-on-demand printers, such as bubble jet printers.

The ink solids are transferred in the desired design by means of a printer onto a substrate, which becomes the printed medium. The substrate may be paper, or it may be other material. The ink jet printer may incorporate a thermal process, but the ink solids of the invention do not activate at the operational temperatures of the printer. Heat activation of the ink solids does not take place at the time of printing of the image on to the medium by the printer. The non activated ink solids produce a printed image on the medium which is recognizable, but the colors are dull and are not acceptable for most applications. The ink jet printer may incorporate piezo, thermal or drop on demand printing means.

Sufficient temperature is then applied to the printed image to activate the dyes. The heat activates, or sublimates, the ink solids. The image is then permanently bonded to the substrate. The permanent image is sharp, with vivid colors forming the image.

A liquid ink formulation prepared according to the invention may be used to print the substrate by means of an appropriate ink jet printer. Finely divided dye solids are present and emulsified and emulsified in a liquid carrier. An emulsifying enforcing agent, which has characteristics of a surfactant, surrounds and shields the dye particles to prevent undesired activation at low heat and to prevent agglomeration of the dye particles. However, the emulsifying enforcing agent does not inhibit activation of the dye at higher temperatures.

DETAILED DESCRIPTION OF THE PREFERRED EMBODIMENT

Figure 1:
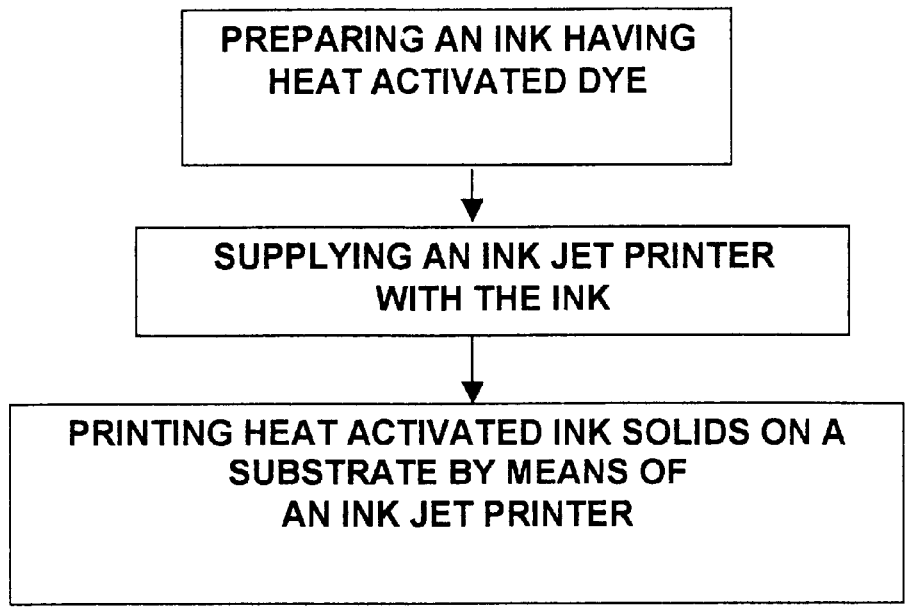
FIG. 1 illustrates an example of a medium printed by the printing process.
Figure 2:
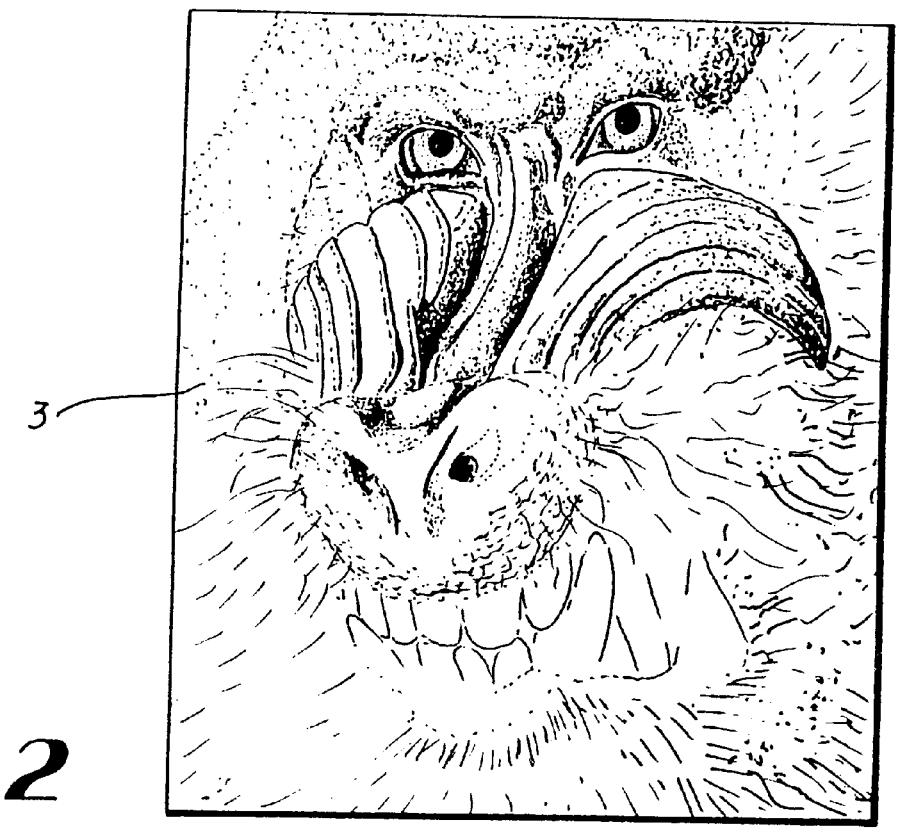
FIG. 2 is an example of the medium printed by the process of the invention.
Figure 3:
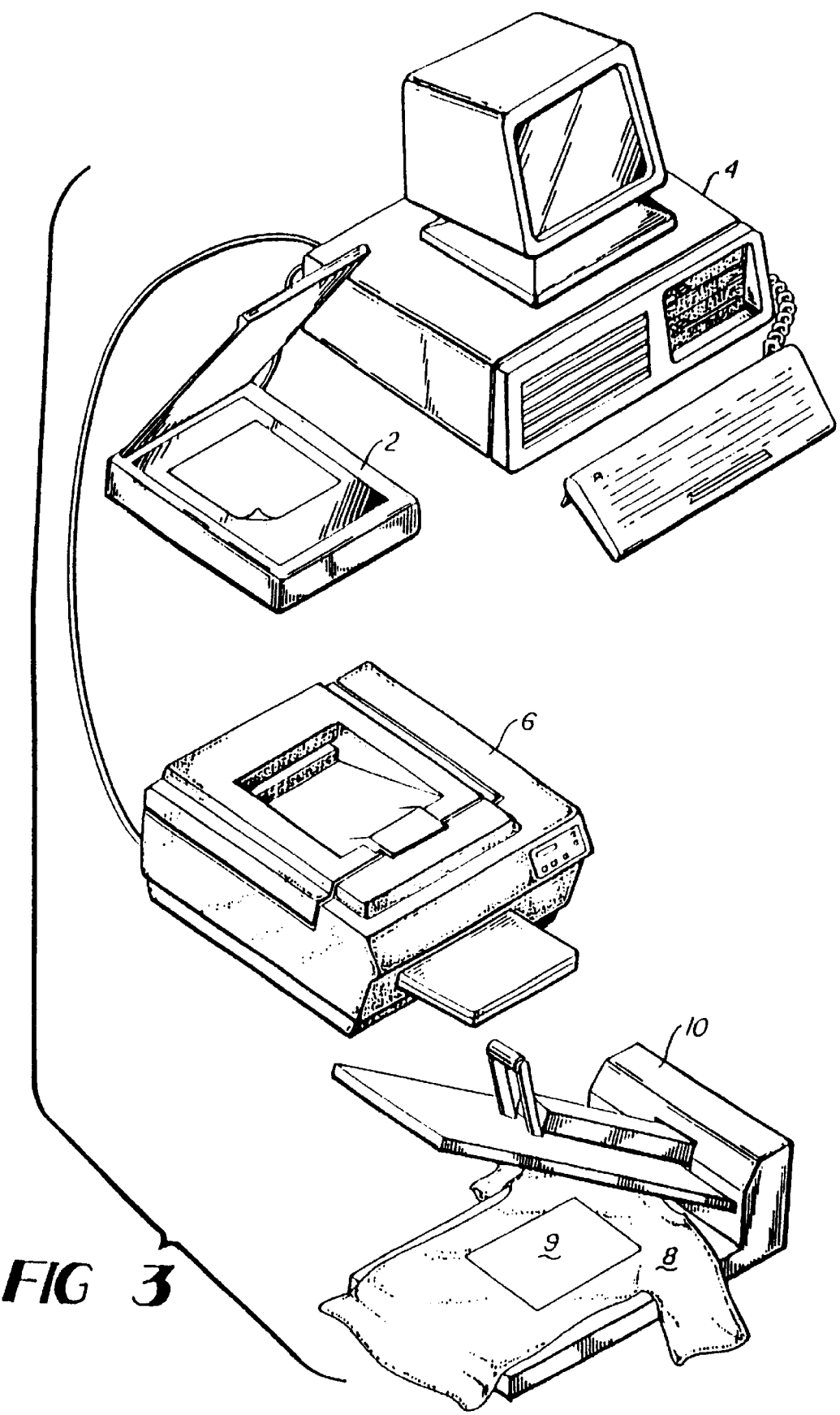
FIG. 3 is a diagrammatic illustration showing exemplary elements of computer and printing systems which may be used to print the medium according to the printing process.

In a preferred embodiment, a video camera or scanning device 2 is used to capture an image 3. FIG. 3. The image is then input into a computer 4. The computer directs a printer 6 to print the image. Any means of forming an image which may be printed from a computer may be used, including images generated by software. Available computer design graphic software may be used, or still photography may be used. The design may be photographic, graphic artistic, or simply letters or words. The use of cyan, yellow and magenta ink compositions allow the printer to print in full color or multi-color designs.

In the present invention, heat activated dyes, such as sublimation dyes are used. A printer, prints ink formulated as described herein onto a substrate without activating the dyes, to form the printed medium. The printer transfers the heat activated dyes with the ink composition onto the medium.

Virtually any material may be used as a medium which can be printed upon by a printer, and which will withstand the heat activation temperature, which may be approximately 400° F. This medium may be any paper commonly used with color ink jet printers, however, standard bond paper may be used, or even a sheet of metal, if the metal can be handled by the printer.

Design 3 is printed onto the medium 9 without activating the ink. A temperature which is sufficient to activate the ink solids is then applied. This temperature will typically be around 400° F. This temperature is applied for a time sufficient to heat activate the ink solids. A heat transfer machine 10 may be used to accomplish the activation of the inks. Activation, or sublimation, does not take place at the time of printing the image onto the substrate which forms the medium, even though heat may be used to accomplish the printing of the image onto the medium. Activation occurs later, and may occur during the transfer of the image from the medium to the final substrate.

Example 1 is a phase change ink formulation for use in phase change ink jet printers. The heat sensitive or heat activated dye or ink solid may be sublimation dye which is finely divided. The transfer material is a wax or wax like material which liquefies at a temperature of 70 to 120° C. to allow printing of the ink onto the medium.

The emulsifying enforcing agent acts as a dispersing agent through which the ink solids are distributed. The emulsifying enforcing agent may be one or more polymers or surfactants, which could be anionic. The binder may be a polymer which strengthens the ink stick when the ink stick is in solid form. The plasticizer increases the solubility of the ink for formulation of the ink stick. The foam control agent and viscosity control agent aid in formulating the ink stick.

The surface tension control agent may be a surfactant. This agent aids in printing of the ink formulation. The diffusion control agent helps control the diffusion of the ink as it is applied to the medium. The flow control agent helps control the melting temperature and rate of the ink during the printing process.

FORMULATION EXAMPLE #1: Cyan phase-change ink-Jet Ink Formula:

| Material | Weight % |
|---|---|
| Sublaprint ® Blue 70014[1] | 10.0 |
| Polywax ® PE500[2] | 10.0 |
| Exxon FN ® 3505[3] | 58.0 |
| DisperByk ® 182[4] | 0.5 |
| Vinnapas ® B1.5[5] | 1.5 |
| Piccolastic ® A25[6] | 10.0 |
| Polygard ®[7] | 5.0 |
| Dibutyl Phthalate | 5.0 |
| Total: | 100.0 |

[1]Keystone Aniline Corporation
[2]Petrolite Corp.
[3]Exxon Chemical Co.
[4]BYK-Chemie, USA
[5]Wacker Chemicals (USA)
[6]Hercules Inc.
[7]Uniroyal Chemical Co.

Polywax PE500 is a transfer vehicle. This transfer vehicle is a wax-like polymer material. Exxon FN 3505 is a hydrocarbon wax used as part of the transfer vehicle. Other waxes or combinations could be used as the transfer vehicle depending on the printer, its operation temperature, the ink to be printed and the medium to be printed.

DisperByk 182 is used as an emulsifying enforcing agent. DispersByk is a polymer type surfactant. Vinnapas B1.5 and Piccolastic are used as binders. Polygard is an antioxidant which is used for corrosion control. Dibutyl phthalate is a plasticizer.

Free flow ink jet printers, drop on demand and bubble jet ink jet printers use inks which are in a liquid form. Ink jet printers which use liquid inks dispense ink through an orifice in an ink container. The printer commands and controls the flow of ink through the orifice to print in the desired manner.

The heat activated inks or dyes are solid particles. Most ink jet printers are designed to be used with liquid inks, but not with inks having solid particulate within the liquid. The presence of solid material clogs the orifice or nozzle of the printer.

Further, liquid ink compositions into which an insoluble or substantially insoluble particulate is placed are not homogenous over time. The solid ink particles in the mixture settle from the liquid toward the bottom of the ink container. This settling increases the clogging of the orifice. Further, print quality is affected if the ink is not consistent.

The liquid ink composition of the present invention is an emulsion comprised of finely divided heat activated ink solids which are placed in an emulsion by means of an emulsifying enforcing agent which is present in a solvent. Humectants, corrosion inhibitors, surfactants, and anti-foaming agents may also be included in the composition.

The formulation of an emulsion comprising heat activated ink solids which is used with ink jet printers requiring liquid inks is as follows:

| Material | Weight % |
|---|---|
| Heat Activated Dye/Ink Solid | 5–30 |
| Emulsifying Enforcing Agent | 1–20 |
| Binder | 0–30 |
| Humectants | 0–40 |
| Foam Control Agent | 0–10 |
| Fungicide | 0–2 |
| Viscosity Control Agent | 0–10 |
| Surface Tension Control Agent | 0–10 |
| Diffusion Control Agent | 0–10 |
| Flow Control Agent | 0–15 |
| Evaporation Control Agent | 0–20 |
| Corrosion Control Agent | 0–10 |
| Cosolvent | 0–30 |
| Solvent | 30–90 |
| TOTAL | 100% |

The heat activated dye or ink solid is finely divided and placed into an emulsion by means of the emulsifying agent and the liquid carrier, which may be water. The remaining agents may be added to facilitate formulation, storage and/or printing of the liquid ink composition.

FORMULATION EXAMPLE #2; Cyan Ink-Jet Formula:

| Material | Weight % |
|---|---|
| Sublaprint ® Blue 70013[8] | 1.0 |
| Lignosol ® FTA[9] | 3.5 |
| ME ® 39235[10] | 10.0 |
| Diethylene Glycol | 9.5 |
| DMSO | 1.0 |
| Distilled H$_2$O | 75.0 |
| Total: | 100.00 |

[8]Keystone Aniline Corporation
[9]Lignotech (U.S.) Inc.
[10]Michelman, Inc.

Sublaprint® Blue 70013 is a heat activated ink or dye solid. Lignosol® FTA is used as an emulsifying enforcing agents. Lignosol® FTA also acts as a fungicide. ME® 39235 is a polymer, and more specifically, it is a polyethylene binder. Diethylene glycol and DMSO act as humectants. The solvent and liquid carrier is distilled water.

The heat activated ink solid is finely divided to a small particle size. The finely divided ink solid is combined with one or more emulsifying enforcing agents, which are in turn combined with the water which acts as a liquid carrier and as a solvent.

In the relevant art, the term "humectant" is used to describe agents which are included in ink formulations to regulate the rate at which the ink dries and to control the viscosity of the ink. In addition to these properties, the present invention may comprise one or more humectants which will prevent clogging of the orifice or nozzle. With certain inks, the humectants will regulate the sublimation rate of the inks or dyes as they are transferred from the medium to the object on which the printed design is to permanently appear. The humectant in formulation example 2 is diethylene glycol, which acts as a co-solvent and humectant.

Formulation Example #3: Magenta Ink-Jet Ink Formula:

| Material | Weight % |
|---|---|
| Intratherm ® Brill Red P-1314 NT[11] | .5 |
| Lignosol ® FTA[12] | 3.0 |
| ME ® 39235[13] | 11.0 |
| NA-SUL ®[14] | 1.0 |
| DeeFo ® 806-102[15] | 0.2 |
| Sorbitol | 0.5 |
| Dipropylene Glycol | 3.5 |
| Distilled H$_2$O | 79.3 |
| Total | 100.0 |

[11]Crompton & Knowles Corporation
[12]Lignotech (U.S.) Inc.
[13]Michelman, Inc.
[14]King Industries
[15]Ultra Additives Formulation Example #3 comprises a heat activated ink solid or dye which is finely divided and combined in an emulsifying enforcing agent. The emulsifying enforcing agent or medium is, as with Example #2, Lignosol® FTA and ME® 39235. Distilled water is used as a solvent. Dipropylene Glycol is used as a humectant.

Formulation Example #3 further comprises an antifoaming or foaming control agent, DeeFo® 806–102 to retard foaming of the liquid ink composition. Formulation Example #3 further comprises a surfactant, which may be Sorbitol®, and a corrosion inhibitor, which, in this example, is NA-SUL®.

Formulation Examples 2 and 3 are emulsions. The invention provides an emulsion or colloid which will work within free flow ink jet printers, drop on demand ink jet printers, piezo electric ink jet printers, and bubble jet printers, without experiencing problems relating to orifice clogging which results from the use of an ink solid. Further, the use of an emulsion or colloid prevents the separation of the ink solids from the liquid components, rendering an ink composition which is stable over time. Typically, the liquid ink formulations are present within the printers in containers. Three or more colors of liquid ink are present. The containers may be factory sealed, and as such, the ink formulation may be held within the container for a long period of time.

The thermal, bubble jet printer forms the bubble which is used to print the ink at approximately the boiling point of the ink solvent. In most formulations, water will be used as the solvent, so that the ink is exposed to temperatures of 100 degrees C. or higher as the ink is printed. Comparable temperatures may be used in free flow ink jet printers to create pressure for the purpose of transporting the ink for printing. As with the phase change ink jet printer, the ink is exposed to temperatures which will activate or sublimate some heat activated inks or dyes. The inks or dyes used in the ink compositions herein will not activate or sublimate at the operational temperatures of the printer.

The liquid ink formulation comprises a liquid carrier. The liquid carrier, or solvent, may be water. An emulsifying enforcing agent, which is soluble in the liquid carrier, forms an emulsion in the liquid carrier. The emulsifying enforcing agent has an affinity for the heat activated dye, and attaches to, or surrounds, all or part of individual particles of the dye particles.

The heat activated dye as used is a finely divided solid which is substantially insoluble in the liquid carrier. The dye particles, when placed in a liquid, will tend to agglomerate, vastly reducing, and practically eliminating, the efficacy of the ink formulation. The emulsifying enforcing agent is used to form an emulsion or a colloid, and in the present invention, also surrounds and shields, and thereby separates, the individual dye particles from the liquid carrier and from each other, preventing agglomeration of the dye particles, and thereby preventing the ink formulation from clogging the orifices of the printer, such as the ink jets. The emulsifying enforcing agent shields and insulates the dye particles, preventing activation or sublimation of the dye due to exposure to heat present in the printer and the printer processes. The emulsifying enforcing agent shields the dye particles, and improves the shelf life of the ink formulation. The adverse effects of heat, chemical reactions, light, time, and other factors that may be present in the packaging environment, or any environment within or surrounding the printer, or printing processes are eliminated or reduced by the emulsifying enforcing agent. However, while the emulsifying enforcing agent shields the dye particles, the insulation properties of the emulsifying enforcing agent are such that heat activation of the heat activated dye is achieved during final transfer of the image from the medium, which is performed at, or above, the temperature at which the dye activates, and the required optical density of the dye after final transfer by heat activation is attained.

An example of an emulsifying enforcing agent which will achieve the objects of the invention, when used with water as a liquid carrier, is a metallic sulfonate salt known as lignin sulfonate. Lignin sulfonates are sold under various brand names, including Lignosol and Raykrome. Other lignin products which may be used as the emulsifying enforcing agent to produce stable dispersion/emulsion systems include kraft lignin products and oxylignins.

Generally, lignin materials may be categorized by the two main processes in manufacturing lignins: kraft pulping and sulfite pulping. Each of the processes produce lignin materials with different structures and molecular weights, and therefore, they exhibit different performance properties in dye dispersing, stabilizing and emulsification. Other than these two groups, there is a group of lignin products called oxylignins, which are derived from lignins that have been oxidized and have a reduced number of sulfonic and methoxyl groups, and increased number of functional phenolic, hydroxyl and carboxylic groups.

Lignin products can be further modified through processes or reverse processes of sulfonation, methylation, carboxylation and fractionation, etc. in order to change their chemical and physical properties, such as water solubilities in different pH ranges, molecular weight, heat stability and emulsification ability.

Lignin sulphonate, kraft lignins, or oxylignins can be used as dye dispersant/emulsifying enforcing agents in the invention to generate stable sublimation or heat sensitive dye emulsion/colloid systems, with proper adjustment of solvent and usage level. Lignosulfonate products such as Maprasperse CBA-1 (Lignotech), Marasperse 52CP (Lignotech), Lignosol FTA (Lignotech), Lignosol SFX-65 (Lignotech), Temsperse S002 (Temfibre, Inc.) Stepsperse DF series (Stephan Co.), and Weschem NA-4 (Wesco Technologies, LTD) may be used. Kraft lignin products such as Diwatex XP (Lignotech), and Reax 85 (Westvaco), and oxylignin products such as Marasperse CBOS-6 and Vanisperse CB are suitable for use as the emulsifying enforcing agent in the ink formulation of the present invention. The resulting aqueous system forms a double-layer structure, with a dye particle in the center surrounded by lignin molecules and another hydrated layer on the outer layer, to shield the dye particles from reagglomerating, and from the effects of chemical and physical changes introduced during storage or printing of the ink formulation.

Other materials can be used as either emulsifying enforcing agents or as additives to improve the emulsion/colloid stability, and thereby enhance the printing quality, by eliminating clogging and kogation at the print head. These materials may comprise a concentration from 0.1% to 15% by weight of the total formulation without damaging the sublimation heat transfer quality of the heat-sensitive dye at the heat transfer stage. These materials can be added into the system during the process of reducing the particle size of the dyes, or after the dye particles have been dispersed into the aqueous solution. These materials function also as emulsion/colloid stabilizers, leveling agents, wetting agents, or foam control agents.

The materials which can be used for this purpose include alkylaryl polyether alcohol nonionic surfactants, such as Triton X series (Octylphenoxy-polyethoxyethanol); alkylamine ethoxylates nonionic surfactants such as Triton FW series, Triton CF-10, and Tergitol (Union Carbide Chemicals); polysorbate products such as Tween (lCl Chemicals and Polymers); polyalkylene and polyalkylene modified surfactants, such as Silwet surfactants (polydimethylsioxane copolymers) and CoatOSil surfactants from OSl Specialties; alcohol alkoxylates nonionic surfactants, such as Renex, BRlJ, and Ukanil; Sorbitan ester products such as Span and Arlacel; alkoxylated esters/PEG products, such as Tween, Atlas, Myrj and Cirrasol surfactants from lCl Chemicals and Polymers; unsaturated alcohol products such as surfynol series surfactants from Air Products Co., alkyl phosphoric acid ester surfactant products, such as amyl acid phosphate, Chemphos TR-421; alkyl amine oxide such as Chemoxide series from Chemron Corporation; anionic sarcosinate surfactants such as Hamposyl series from Hampshire Chemical corporation; glycerol esters or polyglycol ester nonionic surfactants such Hodag series from Calgene Chemical, Alphenate (Henkel-Nopco), Solegal W (Hoechst AG), Emultex (Auschem SpA); and polyethylene glycol ether surfactants such as Newkalgen from Takemoto Oil and Fat Co.

The solid dyes which are used in the ink formulation and in the printing process have a particle size which is too large for use in ink jet printers, as such dyes are currently commercially available. The particle size and nonsolublilty in water also presents other problems previously discussed. The dye must be finely divided, which may be accomplished using mills, grinders, homogenizers or micronizers. One or more different agents including surfactants dispersants, emulsifying agents, wetting agents, defoamers or antifoamers, or corrosion inhibitors may be used in the process to improve and facilitate the process of finely dividing the dye. Examples of grinding devices to finely divide the dye include microfluidizers, roller mills, vertical mills, horizontal mills, jet mills, ball mills, attrition mills, and ultrasonic micronizer/homogenizing mills.

For example, the heat sensitive dye is mixed with the emulsifying enforcing agent, and/or other additives and co-solvents, and deionized distilled water. The dry chemicals are mechanically mixed, dispersed into the liquid phase, and then fed into grinding facility. The grinding device is operated while monitoring temperature, pressure, viscosity, interfacial tension, surface tension, pH value and flow speed, without activating the heat sensitive dye, until the mean diameter of the dye particles is no larger than 0.5 microns.

Particles which have a diameter of larger than 0.2–0.5 microns should be eliminated from the composition, such as by filtration or centrifuge. The resulting ink composition has a mean particle size of 0.2 microns or less, with the solid percentage ranging from 0.05%–10% by weight, to produce an ink composition which achieves the objectives of the present invention.

Phase change ink jet printers use an ink composition which is solid at ambient temperature. The ink composition may be in a solid stick form. This "ink stick" comprises heat activated inks, and a phase change material, or transfer vehicle, which will liquefy upon the application of heat to the ink composition. A polymer binder and additives may be added to the ink composition. The additives may be used to control melting, flow, drying, corrosion and other variables. The composition is changed from solid to liquid by melting the ink stick in a controlled fashion, to apply the ink solids to the medium, and achieve printing. The melted ink composition is contained in a liquid form in a reservoir at the necessary elevated temperature to maintain the ink composition in liquid form. The liquefied ink composition is then taken from the reservoir and printed on demand. The ink composition may be present in the printer in three or more colors, such as cyan, yellow and magenta, and applied by the printer in combination to achieve multiple color or full color printing.

The transfer vehicle may be a wax or wax like material, such as a certain polymers having a low molecular weight and low melting point. Since wax and wax like materials in liquid form tend to have an affinity for paper, the transfer vehicle will readily bond with the paper medium, holding the ink solids to the medium, until the ink solids are released by the application of heat which is sufficient to activate the ink solids, and to transfer the ink solids, if desired.

The formulation for an ink composition used with a phase change ink jet printer is as follows:

| Material | Weight % |
| --- | --- |
| Heat Activated Dye/Ink Solid | 5–30 |
| Transfer Vehicle | 20–70 |
| Emulsifying Enforcing Agent | 1–20 |
| Binder | 0–30 |
| Plasticizer | 0–15 |
| Foam Control Agent | 0–10 |
| Viscosity Control Agent | 0–10 |
| Surface Tension Control Agent | 0–10 |
| Diffusion Control Agent | 0–10 |
| Flow Control Agent | 0–15 |
| Corrosion Control Agent | 0–10 |
| Antioxidant | 0–5 |
| TOTAL | 100% |

What is claimed is:

1. A printed medium produced by a process comprising the steps of:
   a. preparing a solid ink jet ink formulation comprising heat activated dye solids, from 1% to 20% of at least one emulsifying enforcing agent, and from 20% to 70% by weight of a transfer vehicle; and from 0% to 30% by weight of a binder;
   b. supplying an ink jet printer with said ink formulation:
   c. printing said ink formulation in a desired image by means of said jet printer onto a medium at a temperature which is below the temperature at which said heat activated dye solids activate, wherein said solid ink jet formulation is liquefied by said ink jet printer, and wherein said at least one emulsifying enforcing agent emulsifies said heat activated dye solids within said ink jet formulation during liquefaction of said solid ink jet formulation by said ink jet printer.

2. A printed medium produced by the process described in claim 1, wherein said medium does not comprise an ink binder prior to printing said liquid ink formulation by means of said jet printer onto said substrate.

3. A printed medium produced by a process comprising the steps of:
   a. preparing a liquid ink formulation suitable for use in an ink jet printer which uses liquid ink, said liquid ink formulation comprising heat activated dye solids, at least one least one emulsifying enforcing agent for shielding the heat activated dye solids and at least one liquid carrier wherein said ink formulation comprises not less than 1%, nor more than 20%, of said at least one emulsifying enforcing agent by weight;
   b. supplying an ink jet printer which uses liquid ink with said liquid ink formulation; and
   c. printing said liquid ink formulation in a desired image by means of said ink jet printer onto a substrate at a temperature which is below the temperature at which said heat activated dye solids activate.

4. A printed medium produced by the process described in claim 3, wherein said at least one liquid carrier is water.

5. A printed medium produced by the process described in claim 4, wherein said ink comprises not less than 30% water by weight.

6. A printed medium produced by a process comprising the steps of:
   a. preparing a liquid ink formulation suitable for use in an ink jet printer which uses liquid ink, said liquid ink formulation comprising heat activated dye solids, at least one emulsifying enforcing agent for shielding the heat activated dye solids, and water;
   b. supplying an ink jet printer which uses liquid ink with said liquid ink formulation; and
   c. printing said liquid ink formulation in a desired image by means of said ink jet printer onto a substrate at a temperature which is below the temperature at which said heat activated dye solids activate.

7. A printed medium produced by the process described in claim 6, wherein said ink formulation comprises not less than 30% water by weight.

8. A printed medium produced by the process described in claim 6, wherein said liquid ink formulation comprises from 1% to 2% by total weight of said liquid ink formulation of said heat activated dye solids, and from 1% to 20% of at least one emulsifying enforcing agent.

9. A printed medium produced by a process comprising the steps of:
   a. preparing a liquid ink formulation suitable for use in an ink jet printer which uses liquid ink, wherein said liquid ink formulation comprises at least one liquid carrier, at least one emulsifying enforcing agent, and heat activated dye solids which are finely divided to a particle size which yields an emulsion when said heat activated dye solids are emulsified within said at least one liquid carrier by means of said emulsifying enforcing agent, wherein said ink formulation comprises not less than 1%, nor more than 20%, of said at least one emulsifying enforcing agent by weight;
   b. supplying an ink jet printer which uses liquid ink with said liquid ink formulation;
   c. printing said liquid ink formulation in a desired image by means of said ink jet printer onto a substrate at a temperature which is below the temperature at which said heat activated dye solids activate.

10. A printed medium produced by the process described in claim 9, wherein said at least one liquid carrier is water.

11. A printed medium produced by the process described in claim 10, wherein said liquid ink formulation comprises not less than 30% water by weight.

12. A printed medium produced by a process comprising the steps of:
   a. preparing a liquid ink formulation suitable for use in an ink jet printer which uses liquid ink, wherein said liquid ink formulation comprises water as a liquid carrier, at least one emulsifying enforcing agent, and heat activated dye solids which are finely divided to a particle size which yields an emulsion when said heat activated dye solids are emulsified within said at least one liquid carrier by means of said emulsifying enforcing agent;
   b. supplying an ink jet printer which uses liquid ink with said liquid ink formulation;
   c. printing said liquid ink formulation in a desired image by means of said ink jet printer onto a substrate at a temperature which is below the temperature at which said heat activated dye solids activate.

13. A printed medium produced by the process described in claim 12, wherein said liquid ink formulation comprises not less than 30% water by weight.

14. A printed medium produced by the process described in claim 12, wherein said liquid ink formulation comprises from 1% to 2% by total weight of said liquid ink formulation of said heat activated dye solids, and from 1% to 20% of at least one emulsifying enforcing agent.

* * * * *